United States Patent
Bandy et al.

(10) Patent No.: US 6,275,643 B1
(45) Date of Patent: Aug. 14, 2001

(54) ATTENUATOR ELEMENT FOR USE WITH AN OPTICAL FIBER ADAPTER

(75) Inventors: James C. Bandy, Duluth; Steven E. Sheldon, Norcross; Daniel L. Stephenson, Lilburn, all of GA (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/501,092

(22) Filed: Feb. 9, 2000

(51) Int. Cl.[7] ................................. G02B 6/00; G02B 6/38
(52) U.S. Cl. ................................................ 385/140; 385/60
(58) Field of Search ................................. 385/53, 55, 56, 385/58, 59, 60, 62, 66, 70, 72, 73, 75, 76, 77, 78, 81, 84, 139, 140

(56) References Cited

U.S. PATENT DOCUMENTS

| | | |
|---|---|---|
| 5,067,783 | 11/1991 | Lampert . |
| 5,082,345 | 1/1992 | Cammons et al. . |
| 5,274,729 | 12/1993 | King et al. . |
| 5,351,327 | 9/1994 | Lurie et al. . |
| 5,384,885 | 1/1995 | Diner . |
| 5,481,634 | 1/1996 | Anderson et al. . |
| 6,188,827 | * 2/2001 | Stephenson ...................... 385/140 |

* cited by examiner

Primary Examiner—Cassandra Spyrou
Assistant Examiner—Euncha Cherry
(74) Attorney, Agent, or Firm—Needle & Rosenberg, P.C.; Charles H. Fails, Esq.

(57) ABSTRACT

An attenuator element for use within an optical fiber adapter is disclosed. The attenuator element has an elongate block-like head, the head having tapered side walls and beveled surfaces extending along a portion of the respective side walls and a lower planar surface thereof, a neck extending from the lower surface thereof, and an attenutaor disk extending from the neck. The attenuator element is constructed and arranged so that it may be inclined through an angle of from 90° to 82° with respect to the longitudinal axis of an alignment sleeve used to couple two optical fiber connectors together in order to accommodate the coupling of optical fiber ferrules having end faces which are aligned with one another along the longitudinal axis of the alignment sleeve, or where the ferrule end faces may be angled with respect to the longitudinal axis of the alignment sleeve. The attenuator element is also constructed and arranged so that it may also be selectively rotated about a longitudinal axis of the attenuator disk and between the end faces of the opposed ferrules received within the alignment sleeve.

25 Claims, 5 Drawing Sheets

(PRIOR ART)

ATTENUATOR ELEMENT FOR USE WITH AN OPTICAL FIBER ADAPTER

FIELD OF THE INVENTION

This invention relates in general to optical fiber adapters. More particularly, the invention relates to an attenuator element adapted for use within an optical fiber adapter and received between the opposed ferrules of two optical fiber connectors being joined in the adapter for attenuating an optical signal passed therethrough.

BACKGROUND OF THE INVENTION

The use and construction of optical fiber cables, and of optical fiber build-outs or adapters used for coupling optical fiber cables together is well known. The optical fiber cables to be coupled are typically provided with optical fiber connectors at their ends, the connectors being one of the several known types of connectors, to include, for example, one or a combination of the SC, an ST®, an FC and/or LC types of optical fiber connectors. The build-out or adapter will typically comprise a housing constructed for receiving two opposed optical fiber connectors therein so that the ends of the opposed ferrules housing the optical fibers are axially aligned for transmitting an optical signal therethrough and along a transmission path extending the length of the connected optical fiber cables.

It is oftentimes desirable, if not necessary, to introduce an attenuator or some type of attenuation device into the transmission path of the optical signal in order to reduce the strength of the incoming signal to a desirable or manageable power level. Such attenuation oftentimes occurs at a patch panel or bulkhead where the attenuating element remains in a fixed position with respect to, and is not otherwise a part of or incorporated into the optical fiber. Accordingly, the attenuation element or device is typically incorporated into the coupling, also referred to by those skilled in the art as a build-out or an adapter, which extends through the panel and into which the incoming and outgoing optical fiber connectors and cables are attached, respectively.

The ability to change the attenuation level is also needed, however, as it is known that the efficiency of an optical fiber circuit decreases with age, in that the power of a signal source, which may be adequate at the beginning of the life of the circuit, may later become inadequate. Moreover, if the power of the signal at the beginning of the service life of the circuit is chosen so that it remains adequate as the circuit ages, other components of the circuit may become saturated early in the circuit's life, rendering them less efficient. In addition, the unearthing of optical fiber cables, for example by being accidentally cut or damaged during construction or installation, results in repairs to the cable that add optical loss to the transmission path which also requires that any attenuation element(s) in use be decreased in strength in order to make up for the loss in signal strength caused by any such cable splices.

The known types of optical attenuators generally fall into four categories. First, there are air gap attenuators in which various fixed filter elements are suspended in an air gap between the ferrules of the optical fiber connectors, the ferrules being received in a coupling or alignment sleeve which includes a means for preventing contact between the two ferrule ends, or with various filter elements suspended in the area. A second category of attenuators comprise an air gap in which attenuation is increased by increasing the length of the gap, i.e., the distance between the opposed ferrule ends within the alignment sleeve. In a third type of attenuator arrangement, a high density, translucent, laminated attenuator element that may be varied in the thickness is provided for different attenuation levels, and is mounted in a transverse slot within the alignment sleeve. A fourth class of attenuators are those used with biconic connectors of the type having two tapered plugs, with the plugs being received in a sleeve having opposed conically shaped plug receiving cavities.

One of the more common attenuator arrangements currently used is the third type of attenuator arrangement described above, in which a plate like element is suspended or positioned between the opposed ferrule ends of two optical fiber connectors, and can be varied in thickness for attenuating the optical signal passed therethrough and along the transmission path. Examples of such prior art attenuators are shown in U.S. Pat. No. 5,067,783 to Lampert, and U.S. Pat. No. 5,082,345 to Cammons, et al., both of which are assigned to Lucent Technologies, Inc. This type of prior art attenuator element is also illustrated in FIG. 1, and is described in greater detail below.

Figure 1:
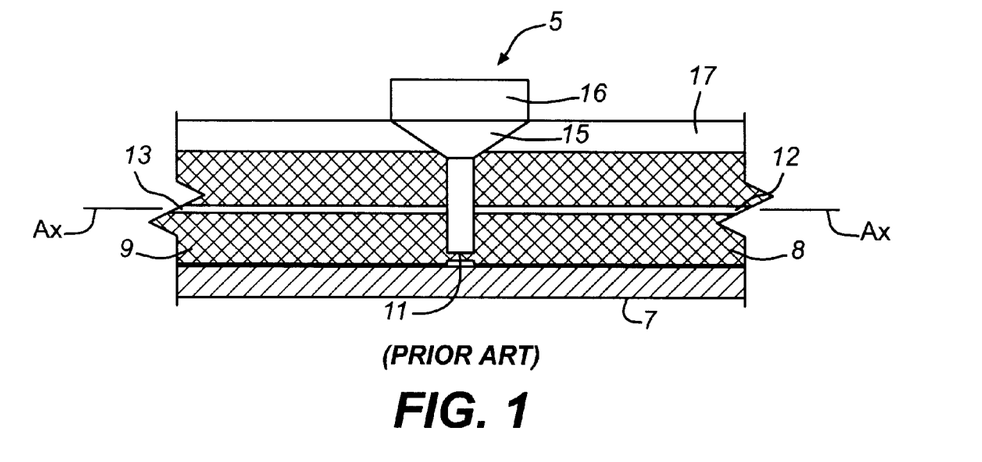
FIG. 1 is a side elevational view in cross section of a prior art attenuator element arrangement.

Referring now to FIG. 1, an attenuator element 5 is shown positioned within an elongate alignment sleeve 7 of an optical fiber adapter (not illustrated), and is formed about a longitudinal axis denoted by the reference character "$A_x$." A ferrule 8 of a first optical fiber connector (not illustrated) is spaced from and opposed to an axially aligned ferrule 9 of a second optical fiber connector (not illustrated) along the longitudinal axis $A_x$ of the alignment sleeve. The attenuator element comprises a cylindrical disk 11 positioned between the optical fiber 12 of ferrule 8, and the optical fiber 13 of ferrule 9, and is used to decrease the signal strength of the optical signal passed along the transmission path comprised of the two optical fibers.

The attenuator disk is positioned between the two optical fibers by being suspended from a shoulder 15, the shoulder depending from a head 16 received within an elongate slot 17 formed in the alignment sleeve. The slot 17 extends in the lengthwise axial direction of the sleeve. As shown in FIG. 1, the ends of the ferrules 8, 9 are formed to be slightly spherical, with a complimentary spherical curve being embossed or otherwise formed in the attenuator disk 11 such that the ferrules are received snugly against the attenuator disk, but are spaced from one another such that the ferrule ends do not touch each other within the alignment sleeve 7.

This type of attenuation arrangement has proven to be highly successful, and is commonly found in use with a wide variety of optical fiber adapters. However, although this type of attenuator element/device has proven to be highly successful, improvements in the coupling of optical fibers together, through the use of spherical angled ferrule end faces, provides a construction for which this type of attenuator element construction is not well suited. Examples of the newer angled spherical construction ferrule end faces are disclosed in U.S. Pat. No. 5,384,885 to Diner, and in U.S. Pat. No. 5,351,327 to Lurie, et al.

In the '327 patent to Lurie, et al., a method of polishing optical fiber ferrules which centers the apex of the spherical end face of the ferrule on an angled optical fiber axis is disclosed. The patent to Lurie, et al., teaches that signal transmission across optical fiber connectors may be improved by imparting an angled finish to the end face of the fibers, i.e., the ferrules, which results in reduced internal reflections of the signals at their end faces. This is so in that in virtually all coupling arrangements in which optical fibers are coupled, the coupling by its very nature introduces discontinuities in the transmission path, i.e., signal reflections, which constitute a serious problem. In simple coupling arrangements, of the type described in the '783 and '345 patents above, these reflections exist, and where an attenuating element such as that shown is present, the problem of reflection may be magnified in that incident power, the amount of light intentionally transmitted from the source to the receiver along the transmission path, may be reduced by unwanted increases in reflected power. As known to those in the art, reflected power describes that amount of light which is reflected at an interface, for example an attenuation element, or other discontinuity in the optical fiber cable, which light reflection can travel back through the fiber toward the light or signal source so that the light or signal source is adversely affected in its performance.

In an effort to combat these problems, the '885 patent to Diner provided a means for attenuating an optical signal transmitted through angled ferrule ends by providing a variable attenuation optical fiber coupling arrangement. In Diner the end faces of each of the optical fiber connectors (ferrules) are formed at an angle with respect to the optical fiber axis, each connector having a locating key thereon so that the connectors may be selectively rotated in position with respect to one another, relative to the fiber end faces, so as to introduce a measured amount of misalignment of the end face of the fiber relative to the other fiber end face for "tuning," as it were, the optical signal passed therethrough and along the transmission path.

Although the use of angled spherical ferrule end faces provides for improved incident power levels and reduced reflections at optical fiber couplings, the large majority of optical fiber couplings are still formed along a longitudinal axis such as that described in the '783 and '345 patents to Lampert and Cammons, et al, respectively, and as illustrated in FIG. 1. However, as the use of angled ferrule end faces increases, due to the improved performance characteristics of such a ferrule construction, the need arises for a simple type of attenuation element which can be used not only with longitudinally aligned optical fiber connectors, but which may also be used with the new generation of "angled" optical fiber ferrule end faces so that only a single type of attenuation device/element need be provided for use with any of the known types of optical fiber couplings without concern as to whether the ferrule end faces are to be longitudinally aligned or angled with respect to one another. None of the known types of attenuator elements, or devices, however, appear suitable for accomplishing this task.

The need exists, therefore, for an improved attenuator element which is capable of being used with any type of optical fiber coupling, and in particular with ferrules having longitudinally aligned spherical end faces, as well as ferrules having angled spherical end faces in any of the several known types of optical fiber adapters/build-outs.

SUMMARY OF THE INVENTION

The present invention provides an improved attenuator element for use with an optical fiber adapter which overcomes some of the deficiencies of the known art. The attenuator element of this invention provides a simple, efficient, and highly flexible means of attenuating an optical signal passed through either axially aligned and/or axially angled ferrule end faces of two opposed optical fibers. The universal application of this improved attenuator element, when contrasted with the known attenuation devices/ arrangements, provides an attenuator element capable of offering a greater degree of reliability, durability, maintainability and ease of use.

This invention attains this degree of flexibility, as well as simplicity in design and construction by providing an improved attenuator element for use as a part of an optical fiber adapter used to couple a first optical fiber connector to a second optical fiber connector so that an optical signal may be passed therethrough. The attenuator element comprises an elongate head formed about a longitudinal axis, the head having a first end and a spaced, opposed second end. The head has a first planar surface and a spaced, opposed second planar surface extending between the first and second ends of the head, respectively, and a first side wall and a spaced, opposed second side wall, each of which also extends between the first and second ends of the head as well as between the first and second planar surfaces thereof. The ends, the side walls, and the planar surfaces of the head are joined to one another along their common edges so that the head is formed in a block-like manner.

Each of the side walls of the head is tapered in its lengthwise direction toward each respective end of the head, and the edges of the head, where the respective side walls and the second planar surfaces intersect, are beveled in their lengthwise direction toward the first planar surface and the respective ends of the head. The attenuator element includes a neck which extends away from the second planar surface of the head, and an elongate attenuator disk which extends from the neck perpendicularly with respect to the longitudinal axis of the head.

The first and second side walls of the head are comprised of first and second portions, respectively, each respective side wall portion being tapered toward the first and second ends of the head, respectively, at an angle of approximately 8° with respect to the longitudinal axis of the head. In similar fashion, the respective pairs of beveled edges of the head are beveled toward the first planar surface and the respective ends of the head at an angle of approximately 8° as well. The neck extends between the head and the attenuator disk, and comprises a pair of arcuate shoulders extending from the second planar surface of the head to the attenuator disk. The two shoulders are aligned with, and face away from one another in the direction of the longitudinal axis of the head.

So constructed, the attenuator element may be moved through an include angle of 16° with respect to a line drawn perpendicularly through the longitudinal axis of the head, when situated within a slotted elongate alignment sleeve of the type known and used with the known types of optical fiber adapters. Moreover, when, and as desired, for example when there may be some slight degree of misalignment between the opposed ferrule ends, be they longitudinally aligned along an axis or angled (inclined) with respect to the longitudinal axis of an alignment sleeve, the head may be selectively rotated about a longitudinal axis of the attenuator disk within the alignment sleeve to ensure alignment of the two ferrule ends with one another and the attenutaor element.

The attenuator element also includes a grip member constructed and arranged to be selectively broken off the head once the head is positioned within the alignment sleeve and received between the opposed ends of two optical fiber connectors/ferrules.

The invention also includes the above-described attenuator element in combination with an elongate alignment sleeve disposed within any of the known types of optical fiber adapters, couplers, or build-outs. The alignment sleeve is formed about a longitudinal axis and has a continuous slotted opening extending in the lengthwise direction thereof, and within which at least a portion of the attenuator element may be selectively positioned for being received between the opposed ferrules of the two respective optical fiber connectors being coupled. The attenuator element is constructed and arranged so that the attenuator disk thereof may be selectively positioned within the alignment sleeve at an angle with respect to the longitudinal axis of the alignment sleeve.

In this combination, the attenuator element may be selectively positioned within the alignment sleeve at an angle in the range of 90° to 82° with respect to the longitudinal axis of the alignment sleeve, in either direction, thus encompassing a 16° included angle with respect to the longitudinal axis of the alignment sleeve. The attenuator element is also constructed so that it may be selectively rotated about the longitudinal axis of the attenuator disk within the alignment sleeve, and between the ferrule ends, for accommodating any misalignment or imperfections in the ferrule ends when placed within the alignment sleeve for being coupled together.

It is, therefore, an object of the present invention to provide an improved attenuator element adapted for use with any of the known types of optical fiber adapters.

It is another object of the present invention to provide an improved attenuator element for use with an optical fiber adapter which is simple in design and construction, is rugged and durable in use, and which is easy to use and replace.

It is yet another object of the present invention to provide an improved attenuator element for use with an optical fiber adapter which may be used with an optical fiber coupling in which the end faces of the ferrules are aligned along the longitudinal axis of an alignment sleeve, or angled with respect thereto.

It is to these objects, as well as to the other objects, features, and advantages of the present invention, which will become apparent upon reading the specification, when taken in conjunction with the accompanying drawings, to which the invention is directed.

DETAILED DESCRIPTION OF THE PREFERRED EMBODIMENTS

Figure 2A:
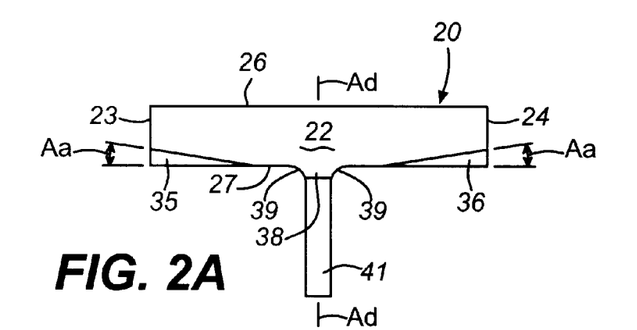
FIGS. 2A–2C illustrate a preferred embodiment of the improved attenuator element of this invention.
Figure 2B:
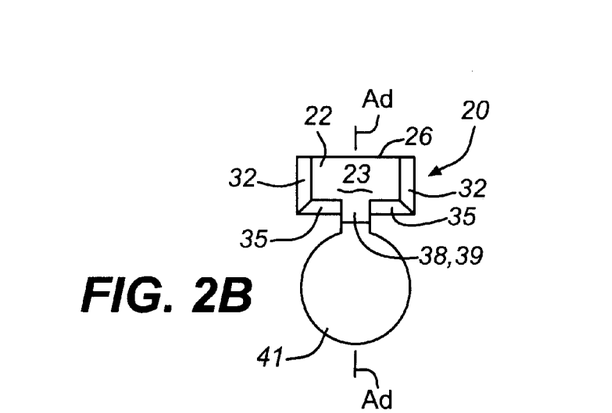
Figure 2C:
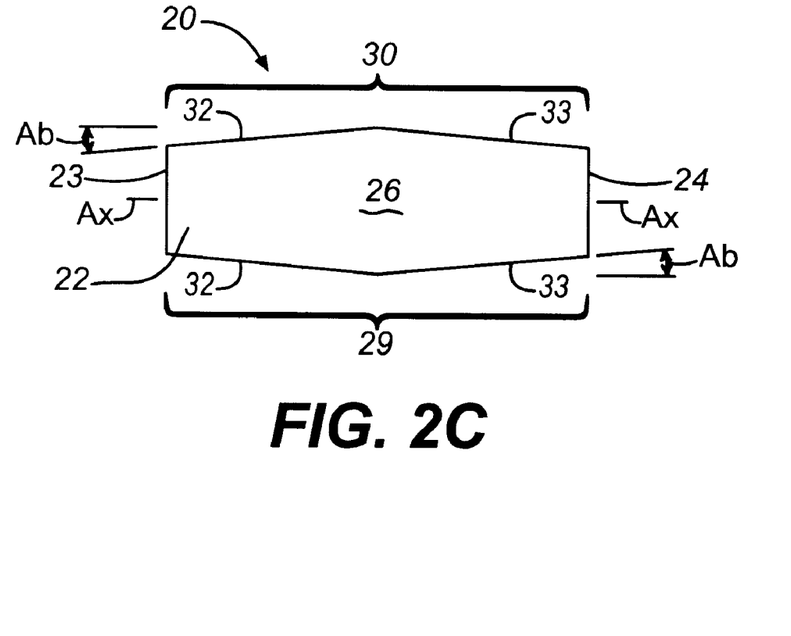

Referring now in detail to the drawings, in which like reference characters indicate like parts throughout the several views, a preferred embodiment of an attenuator element 20 is illustrated in FIGS. 2A–2C. The attenuator element is provided with an elongate head 22 formed along a longitudinal axis, denoted by the reference character "$A_x$" in FIG. 2C. The head has a first end 23 and a spaced, opposed second end 24. Extending between each of the heads 23, 24 is a first or upper planar surface 26, and a spaced, opposed, and parallel second, or lower planar surface 27. Also extending between the first and second ends of the head is a first side wall 29 and a second side wall 30. As shown in FIGS. 2A–2C, the ends 23,24 of the head, the first and second planar surfaces 26, 27, and the first and second side walls 29, 30, respectively, are joined to one another along their common edges such that the head is formed as a block or a block-like structure.

As best shown in FIG. 2C, each of side walls 29, 30 has a first portion 32 extending in the lengthwise direction of and tapered toward the first end of the head 23, and a second portion 33 extending in the lengthwise direction of and tapered toward the second end 24 of the head. As best shown in FIGS. 2A and 2B, a pair of spaced and opposed beveled surfaces 35 are formed along the edge of each of side walls 29, 30 and the second planar surface 27. These beveled surfaces 35 extend in the lengthwise direction of the head toward the first end 23 and angled upwardly toward the first planar surface 26 of the head. In similar fashion, a second pair of spaced and opposed beveled surfaces 36 are formed at the second end 24 of the head, where each of the second portions 33 of the two side walls and the second planar surface 27 of the head intercept.

As shown in FIG. 2A, the beveled surfaces 35, 36 each extend upwardly with respect to the first planar surface 26 through an angle denoted by the reference character "$A_a$", of 8°, although this angle may vary dependent upon the needs of the end user and/or the angled inclination of the spherical ends of the ferrules being coupled within the optical fiber adapter (not illustrated). Here, however, it is anticipated that angle $A_a$ will be 8°, for each of beveled surfaces 35, 36.

In like fashion, the first and second portions 32, 33 of the two side walls 29, 30 are tapered at an angle denoted by the reference character "$A_b$", which angle will preferably be 8°, although this angle may also vary dependent on the needs of the end user. It is anticipated that angle $A_b$ will be 8°, however.

Still referring to FIGS. 2A–2C, a neck portion 38 of the attenuator element is formed on the second planar surface 27, and extends away therefrom. The neck 38 includes, and is shaped by, a pair of arcuate shoulders 39, each one of the two shoulders being aligned with the other along the longitudinal axis $A_x$ of head 22. Lastly, and as best shown in FIGS. 2A and 2B, a circular attenuator disk 41 extends from the neck 38. The attenuator disk 41 extends perpendicularly away from the head 22 with respect to the longitudinal axis $A_x$ thereof, and is formed transversely with respect to the longitudinal axis of the head. Although not illustrated, the attenuator disc may also be formed at an angle relative to the longitudinal axis of the head. It is anticipated, however, that the attenuator disc will be made perpendicular to the head and constructed to allow for rotation of the disc into an angle between the end faces of the optical fiber connectors, if so angled, and as described in greater detail within the specification.

The attenuator element 20 is comprised of an optical quality plastic material, and will preferably comprise polymethyl methylacrylate, although other accepted optical quality plastic materials intended for use in attenuating an optical signal may be used. Also, the thickness of the attenuator disk may be varied, as shown for example for the embodiment of the attenuator disk 41 in FIG. 2A, as contrasted to the second embodiment of the attenuator disk 41' illustrated in FIGS. 3B and C, such that varying levels of attenuation may be obtained. So constructed an entire "family" of attenuator elements 20 will be provided for selectively and progressively attenuating an optical signal passed along the transmission path of the two optical fiber connectors (not illustrated) being coupled to one another within the optical fiber adapter (not illustrated). It is anticipated, therefore, that a range of attenuation of from 0.5 dB to 20 dB will be provided, although lesser and greater degrees of attenuation may be obtainable dependent on the ability to form optical quality plastics, for example polymethyl methylacrylate, in the desired thicknesses.

Figure 3A:
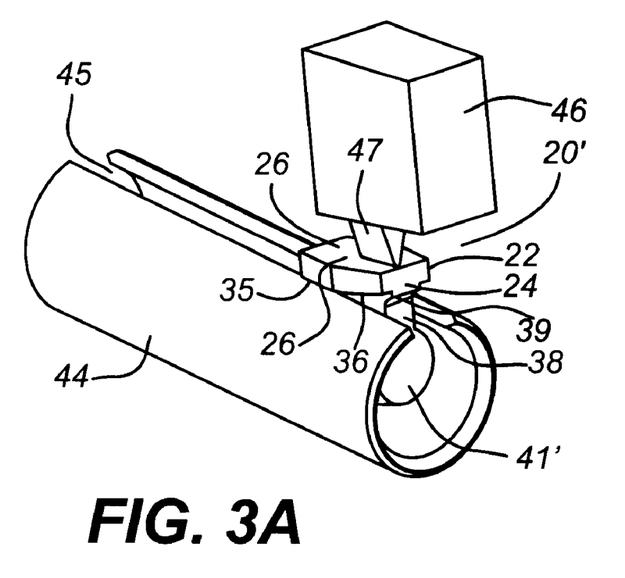
FIGS. 3A–3C illustrate a second embodiment of the attenuator element of FIGS. 2A–2C, with the addition of an attenuator grip member provided as part thereof, with the attenuator element being shown in an angled position within an elongate alignment sleeve of the type used in optical fiber adapters.
Figure 3B:
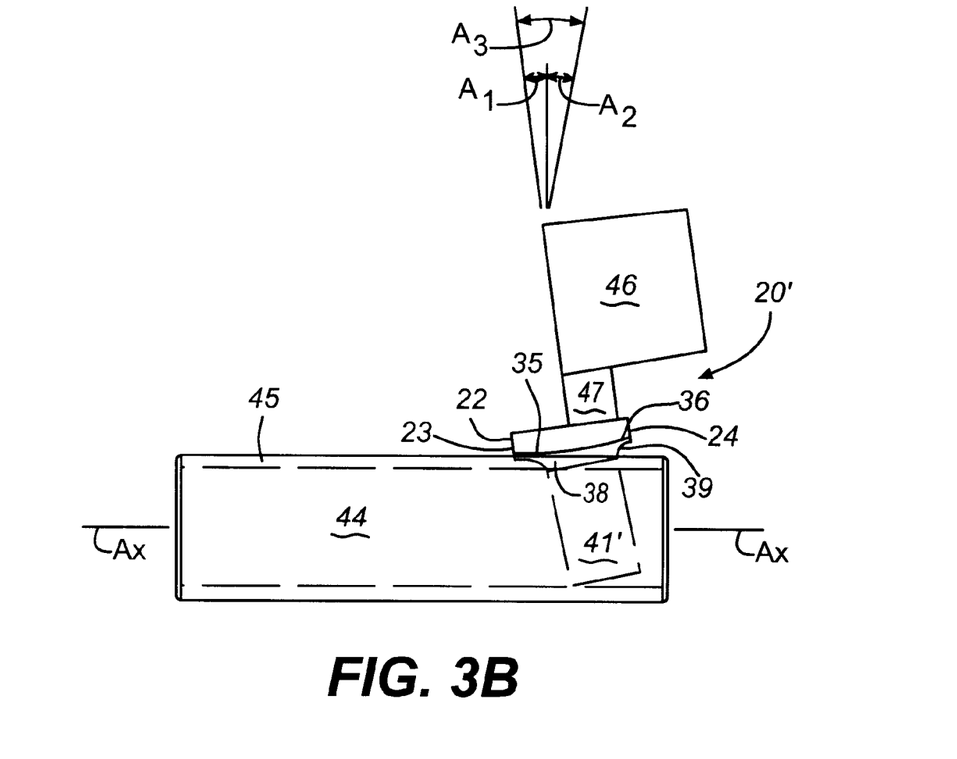
Figure 3C:
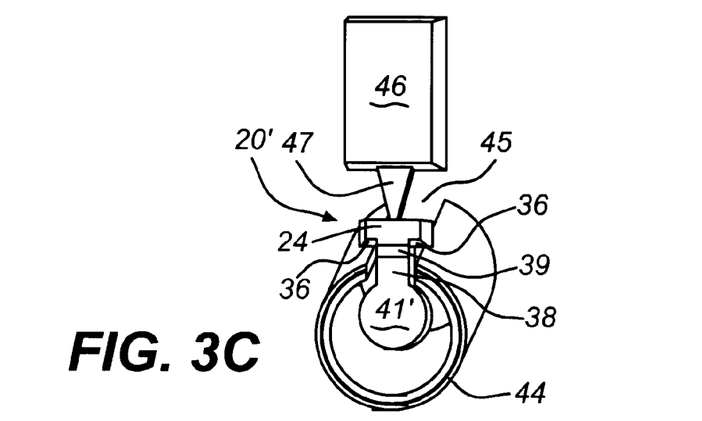

A second embodiment 20' of the attenuator element is illustrated in FIGS. 3A–3C. This second embodiment of the attenuator element differs from that illustrated in FIGS. 2A–2C in that the attenuator disk 41' is thicker in cross-section, for obtaining a greater degree of attenuation than that shown for the attenuator element 20 of FIGS. 2A–2C. The construction of attenuator elements 41, 41', and the variation in thickness thereof, is described in greater detail in U.S. Pat. Nos., 5,067,783 to Lampert, and in U.S. Pat. No. 5,082,345 to Cammons, et al., the provisions of each of which are incorporated by reference as of set forth fully herein.

Referring once again to FIGS. 3A–3C, attenuator element 20' is constructed in fashion identical to attenuator element 20 of FIGS. 2A–2C, with the exception that the attenuator element is provided with a grip member 46 having an elongate break-away member 47 formed as a part of the head 22. The break-away member is constructed and arranged to be broken-off of the head once the grip member has been used to position the attenuator element 20, 20' within an elongate alignment sleeve 44 of the type known in the art, and used with one of the known types of optical fiber adapters. The construction of the grip member 46 and of the break-away member 47 are described in greater detail in U.S. patent application Ser. No. 6,188,827 to Stephenson the provisions of which are incorporated herein by this reference.

As known, therefore, the alignment sleeve 44 is formed about and along a longitudinal axis denoted by the reference character "$A_x$" (FIG. 3B), and includes a continuous elongate slot 45 formed in the periphery thereof. The slot extends the length of the alignment sleeve, and is constructed for allowing the attenuator element to be passed therethrough and along the alignment sleeve for being selectively positioned between the ends of the optical fiber connector ferrules (not illustrated) being coupled.

As shown in FIGS. 3A–3C, attenuator element 20' is inclined with respect to the longitudinal axis $A_x$ of the alignment sleeve at an angle denoted by the reference character "$A_1$", which angle is equal to 8°, and which represents the degree of the beveled surfaces 35 and/or 36 of the head, respectively. These beveled surfaces, in combination with the arcuate construction of the shoulders 39, 38 of the neck, allows the attenuator element 20', and more particularly the head 22 thereof, to be selectively rotated or inclined through an angle of from 90° to 82° with respect to the longitudinal axis of the alignment sleeve.

As illustrated in FIG. 3B, the attenuator element may also be inclined through a second angle $A_2$ with respect to the longitudinal axis of the alignment sleeve, which angle also measures 8°, again due to the 8° bevel of the beveled surfaces 36 at the second end 24 of the head 22, such that the attenuator element may rotate through an included angle $A_3$ with respect to the longitudinal axis of the alignment sleeve, included angle $A_3$ being equal to 16°. As seen, therefore, the attenuator element is constructed in such a manner that it has the freedom to move into a position parallel to the end faces of opposed optical fiber ferrules (not illustrated), whether the end faces of these ferrules are axially aligned along the longitudinally axis of the alignment sleeve, or angled with respect thereto, for example as shown in the construction of U.S. Pat. No. 5,384,885 to Diner and in U.S. Pat. No. 5,351,327 to Lurie, et al., respectively, discussed above.

The position of the attenuator element within the alignment sleeve can therefore be perpendicular, i.e., at an angle of 90° with respect to the longitudinal axis of the alignment sleeve, or inclined at an angle of up to 8°, ie., at an angle of 82° with respect to the longitudinal axis of the alignment sleeve. These 0° and 8° inclined angles are also shown with respect to the longitudinal axis of the attenuator disk 41, 41', denoted by the reference character "$A_d$". Therefore, and as constructed, the attenuator element can be selectively inclined through a 16° included angle and still maintain an exact separation between the ends of the opposed optical fiber ferrules, whereas the design of the prior art attenuator element shown in FIG. 1 can only be used in the 0° or 90° orientation, i.e., where the ferrules are aligned with one another along the axis of the alignment sleeve, such that the prior art attenuator cannot be used with optical fiber ferrules having angled end faces.

The attenuator element 20, 20' of this invention, can work, therefore, with several types of optical fiber ferrules/connectors/adapters. Additionally, and as discussed above, by being able to angle not only the opposed end faces of the ferrules, but also being allowed for the first time to angle the attenuator element as well, reflected power (light) levels are reduced for improving the efficiency of the optical signal passed through the optical fibers and along the transmission pathway in fashion heretofore unknown in the art.

Referring now to FIGS. 4A–4E, the attenuator element 20 is once again illustrated, although this could just as well be the attenuator element 20', within the slot 45 of the elongate alignment sleeve 44. Here, however, as shown in FIGS. 4A–4D, the head 22 is resting on the second planar surface 27 such that the attenuator disk 41 is not inclined or angled with respect to the longitudinal axis $A_x$ of the alignment sleeve 44. This is made possible due to the above-described construction of the head 22, in that the beveled surfaces 35, 36 respectively, are formed at the respective first and second ends 23, 24 of the head, rather than along the entire length of the head. So constructed, the head 22, and in particular the second planar surface 27 thereof, is thus received in a "flat" orientation on the slotted periphery of the alignment sleeve 44 when the ferrule end faces are axially aligned with one another along the longitudinal axis $A_x$ of the alignment sleeve. Where the ferrule end faces are angled with respect to the longitudinal axis of the alignment sleeve, then the attenutaor element is positioned within the alignment sleeve as shown in FIGS. 3A–3C.

Figure 4A:
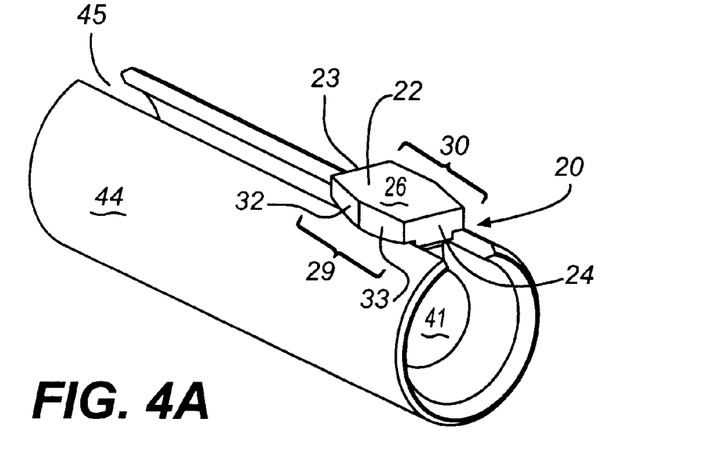
FIGS. 4A–4E further illustrate the attenuator element of FIGS. 2A–2C positioned within the alignment sleeve with the head of the attenuator element aligned with the longitudinal axis of the alignment sleeve, rotated with respect thereto, and angled and rotated with respect thereto.
Figure 4B:
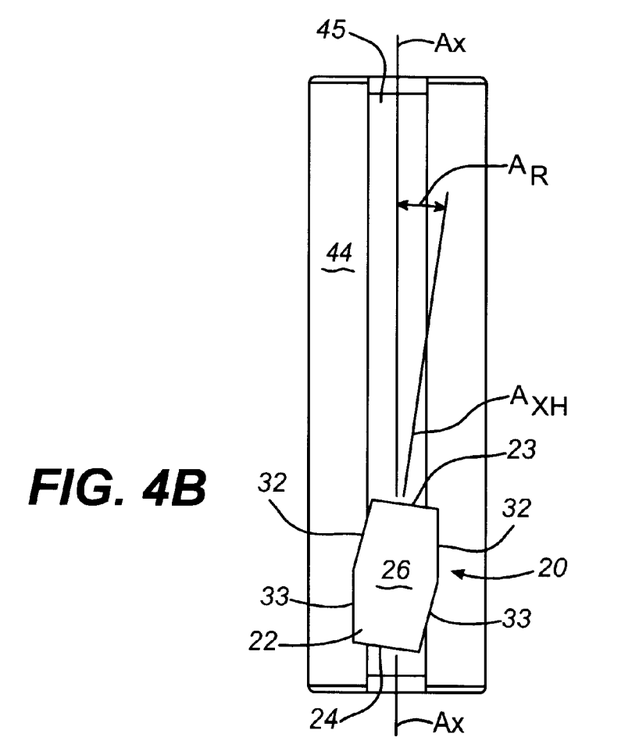
Figure 4C:
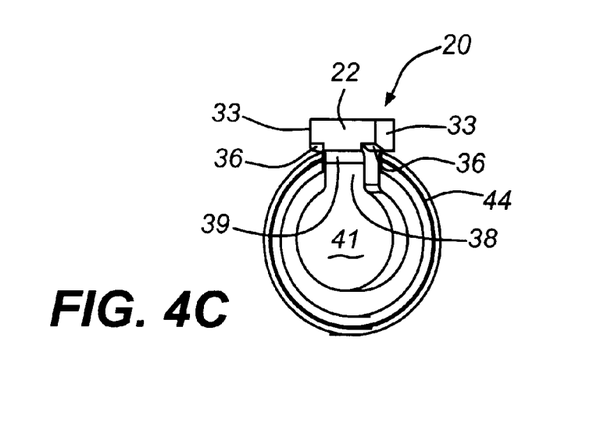
Figure 4D:
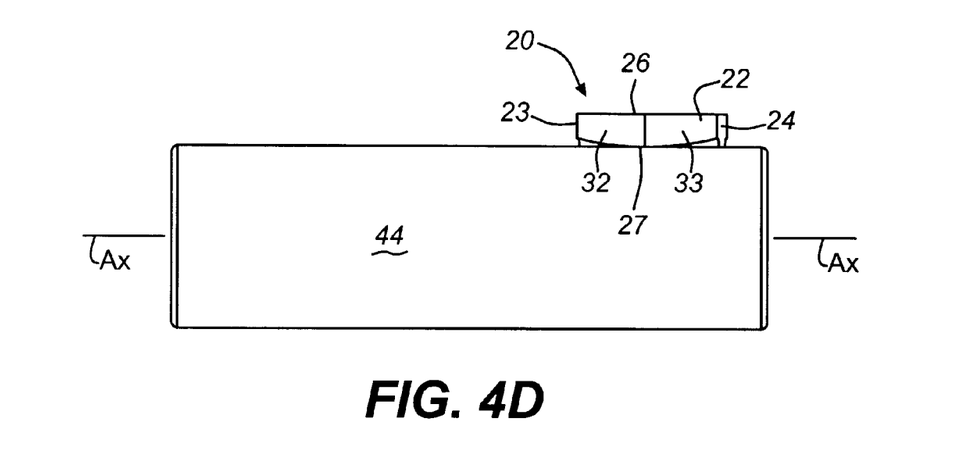
Figure 4E:
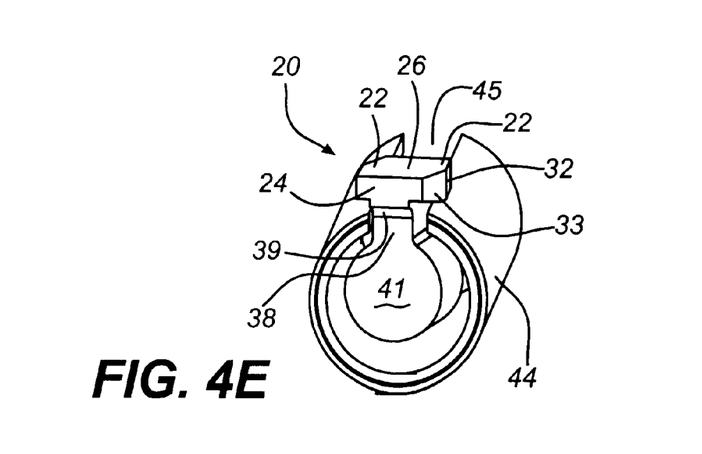

Here, however, and as best shown in FIGS. 4B–4C and 4E, it is now also possible to selectively rotate the attenuator element 20 about the longitudinal axis $A_d$ of the attenuator disk (FIGS. 2A, 2B) through an angle of rotation $A_r$ as illustrated in FIG. 4B with respect to the longitudinal axis $A_x$ of the alignment sleeve in the event there is some misalignment or imperfection in the spherical end faces of the optical fiber connector ferrules (not illustrated). It is anticipated that this angle of rotation $A_r$ will be in the range of from 0° up to 8°, dependent on the construction, i.e., the thickness, of the neck 38 and the shoulders 39 of the attenuator element, and/or the width of the slot 45 defined within the alignment sleeve. Moreover, and as shown in FIG. 4E, this rotation can still occur when the attenuator element 20 is angled with respect to the longitudinal axis of the alignment sleeve, such that the attenuator element can be both inclined and rotated for ensuring that it is received flush against each of the ferrule end faces in order to allow for an exact separation of the ferrule end faces and the attenuation of the optical signal passed therethrough. All this results in the ability to control the return signal or reflected power levels of the optical fiber circuit for improving the performance thereof with the disclosed attenuator element.

It is anticipated that the attenuator element 20, 20', in any of its embodiments shown herein, may be constructed for use in 2.5 mm diameter alignment sleeves when used with the SC, ST®, and/or the FC family of optical fiber adapters, as well as in the 1.25 mm alignment sleeve diameter size when used with the SC type of optical fiber adapters. Moreover, although the use of polymethyl methylacrylate is described, it is anticipated that any optical quality plastic may be used which may provide for greater or lesser attenuation levels, as desired. Additionally, the plastic may be completely transparent, or may be translucent or opaque, such that still greater attenuation levels are attained without having to increase the thickness of the attenuator disk 41, 41'.

Although several preferred embodiments in the invention have been disclosed in the foregoing specification, it is understood by those skilled in the art that many modifications and other embodiments of the invention will come to mind to which the invention pertains, having the benefit of the teaching of the foregoing description and the associated drawings. It is thus understood that the invention is not limited to the specific embodiments disclosed herein, and that many modifications and other embodiments of the invention are intended to be included within the scope of the appended claims. Moreover, although specific terms are employed herein, as well as in the claims, they are used in a generic and descriptive sense only, and not for the purposes of limiting the described invention, or in the claims which follow below.

We claim:

1. An attenuator element for use as a part of an optical fiber adapter used to couple a first optical fiber connector to a second optical fiber connector so that an optical signal is passed therethrough, said attenuator element comprising:
    (i) an elongate head formed about a longitudinal axis, said head having:
        a first end and a spaced and opposed second end;
        a first planar surface and a spaced and opposed second planar surface extending between the first and second ends of the head;
        a first side wall and a spaced and opposed second side wall extending between said first and second planar surfaces, and between said first and second ends of the head, respectively;
        the ends, side walls, and planar surfaces of the head being joined to one another along their common edges;
        wherein each of the side walls of the head is tapered in its lengthwise direction toward each respective end of the head;
        and wherein the edges of the head, where the respective side walls and the second planar surface intersect, are beveled in their lengthwise directions toward the first planar surface and the respective ends of the head;
    (ii) a neck extending away from the second planar surface, wherein said neck comprises a pair of arcuate shoulders extending from the second planar surface of the head, said shoulders being aligned with and facing away from one another in the direction of the longitudinal axis of the head; and
    (iii) an elongate attenuator disc depending from the neck and extending away from the longitudinal axis of the head, wherein the shoulders are configured so as to allow the attenuator element to be selectively rotated or inclined with an angle with respect to the longitudinal axis.

2. The attenuator of claim 1, wherein each said side wall is comprised of a first portion extending toward the first end of said head, and a second portion extending toward the second end of said head.

3. The attenuator of claim 2, wherein the respective first and second portions of each said side wall are tapered toward the first and the second ends of the head, respectively, at an angle of approximately 8 degrees with respect to the longitudinal axis of the head.

4. The attenuator of claim 1, wherein each of the respective beveled edges of the head are beveled toward the first planar surface and the respective ends of the head at an angle of approximately 8 degrees.

5. The attenuator of claim 1, said attenuator disc being constructed and arranged to attenuate the optical signal passed through the optical fiber connectors received in the adapter in a range of from 0.5 dB to 20 dB.

6. The attenuator element of claim 1, wherein said attenutaor disc is sized and shaped to provide an attenuation range of from 0.5 dB to 20 dB.

7. The attenuator of claim 1, wherein said attenuator is comprised of an optical quality plastic material.

8. The attenuator element of claim 7, wherein said plastic material comprises polymethyl methacrylate.

9. The attenuator element of claim 1, further comprising an elongate grip member formed as a part of and extending away from said head.

10. The attenuator element of claim 9, wherein said grip member is constructed and arranged to be selectively broken off of said head.

11. An attenuator element for use with an optical fiber adapter used to couple a first optical fiber connector to a second optical fiber connector so that an optical signal is passed therethrough, each optical fiber connector having an elongate cylindrical ferrule extending away therefrom and being separately and opposably received within an elongate alignment sleeve disposed within the adapter and being formed about a longitudinal axis, the alignment sleeve having a continuous slotted opening extending in the lengthwise direction of the alignment sleeve, at least a portion of the attenuator element being placed within the alignment sleeve between the two opposed ferrules of the respective optical fiber connectors, said attenuator element comprising:
    an elongate head formed about a longitudinal axis;
    a neck depending from said head, said neck being sized and shaped to be passed within the slotted opening of the alignment sleeve; and
    an elongate attenuator disc depending from said neck, said disc being sized and shaped to be passed within the alignment sleeve of the optical fiber adapter;
    wherein said attenuator element is constructed and arranged so that the attenuator disc thereof may be selectively positioned within said alignment sleeve at an angle with respect to the longitudinal axis of the alignment sleeve.

12. The attenuator element of claim 11 wherein said attenuator element is selectively positioned within the alignment sleeve at an angle in a range of from 90 degrees to 82 degrees with respect to the longitudinal axis of the alignment sleeve.

13. The attenuator element of claim 11, wherein said attenuator element is selectively positioned within said alignment sleeve at an angle in a range of from 82 degrees to 98 degrees with respect to the longitudinal axis of the alignment sleeve.

14. The attenuator element of claim 11, wherein said attenuator element is selectively positioned within said alignment sleeve through an included angular range of 16 degrees with respect to the longitudinal axis of the alignment sleeve.

15. The attenuator element of claim 11, wherein the attenuator disc of said attenuator element is selectively rotated about a longitudinal axis of the attenuator disc within the alignment sleeve.

16. The attenuator element of claim 11, further comprising an elongate grip member formed as a part of and extending from said head.

17. The attenuator element of claim 16, wherein said grip member is constructed and arranged to be selectively broken off of said head whereby a user grasps the attenuator element by the grip member to position the attenuator element within the alignment sleeve of the optical fiber adapter, and then break the grip member off of the head to allow the attenuator element to remain in place with respect to the alignment sleeve.

18. The attenuator element of claim 11, wherein said attenutaor disc is sized and shaped to provide an attenuation range of from 0.5 dB to 20 dB.

19. The attenuator element of claim 11, wherein said attenuator element is formed of an optical quality plastic material.

20. The attenuator element of claim 11, wherein said plastic material comprises polymethyl methacrylate.

21. The attenuator of claim 11, the head of said attenuator further comprising:
(i) a first end and a spaced and opposed second end;
(ii) a first planar surface and a spaced and opposed second planar surface extending between the first and second ends of the head;
(iii) a first side wall and a spaced and opposed second side wall extending between said first and second planar surfaces, and between said first and second ends of the head, respectively;
(iv) the ends, side walls, and planar surfaces of the head being joined to one another along their common edges;
(v) wherein each of the side walls of the head is tapered in its lengthwise direction toward each respective end of the head;
(vi) and wherein the edges of the head, where the respective side walls and the second planar surface intersect, are beveled in their lengthwise directions toward the first planar surface and the respective ends of the head;
(vii) the neck extending away from the second planar surface; and
(viii) the elongate attenuator disc depending from the neck perpendicularly with respect to the longitudinal axis of the head.

22. The attenuator of claim 21, wherein each said side wall is comprised of a first portion extending toward the first end of said head, and a second portion extending toward the second end of said head.

23. The attenuator of claim 22, wherein the respective first and second portions of each said side wall are tapered toward the first and the second ends of the head, respectively, at an angle of approximately 8 degrees with respect to the longitudinal axis of the head.

24. The attenuator of claim 21, wherein each of the respective beveled edges of the head are beveled toward the first planar surface and the respective ends of the head at an angle of approximately 8 degrees.

25. The attenuator of claim 21, the neck of said attenuator further comprising a pair of arcuate shoulders extending from the second planar surface of the head, said shoulders being aligned with and facing away from one another in the direction of the longitudinal axis of the head.

* * * * *